United States Patent [19]
Werner

[11] 3,945,718
[45] Mar. 23, 1976

[54] SYNC CONTACT SWITCH FOR MOVIE CAMERA

[76] Inventor: John D. Werner, 1168 S. Washington Way, Denver, Colo. 80210

[22] Filed: July 8, 1974

[21] Appl. No.: 486,384

[52] U.S. Cl. ..................... 352/12; 352/19; 352/20; 352/25; 352/92
[51] Int. Cl.² ........................................ G03B 31/04
[58] Field of Search ............. 352/12, 19, 20, 25, 92

[56] References Cited
UNITED STATES PATENTS
3,515,470   6/1970   Browder ............................... 352/92

Primary Examiner—L. T. Hix
Assistant Examiner—Russell E. Adams, Jr.
Attorney, Agent, or Firm—Burton, Crandell & Polumbus

[57] ABSTRACT

A switch adapted to cooperate with the pull-down claw of a silent movie camera for transmitting an electrical signal each time a frame of movie film is advanced past the shutter of the camera includes an insulating base adapted to be positioned within the film receiving compartment of a movie camera so as to fit around the film gate, the base having a grounding contact arm engaging the gate so as to be grounded through the camera and a contact finger insulated from the gate and disposed for intermittent engagement with the reciprocating pull-down claw which serves to close the switch each time a frame of film is advanced past the shutter.

8 Claims, 9 Drawing Figures

U.S. Patent  March 23, 1976  Sheet 1 of 2  3,945,718
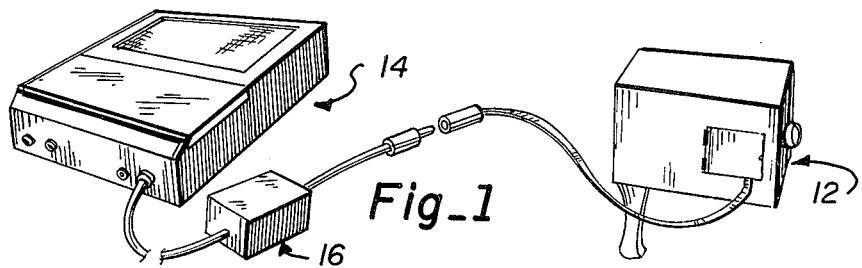
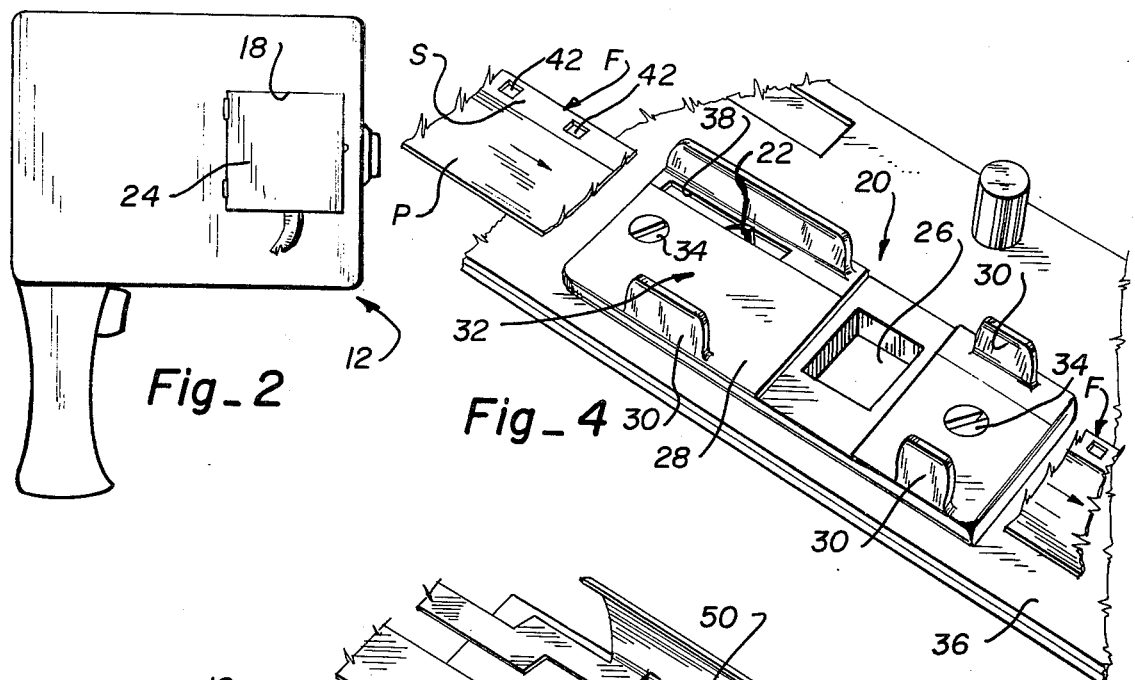
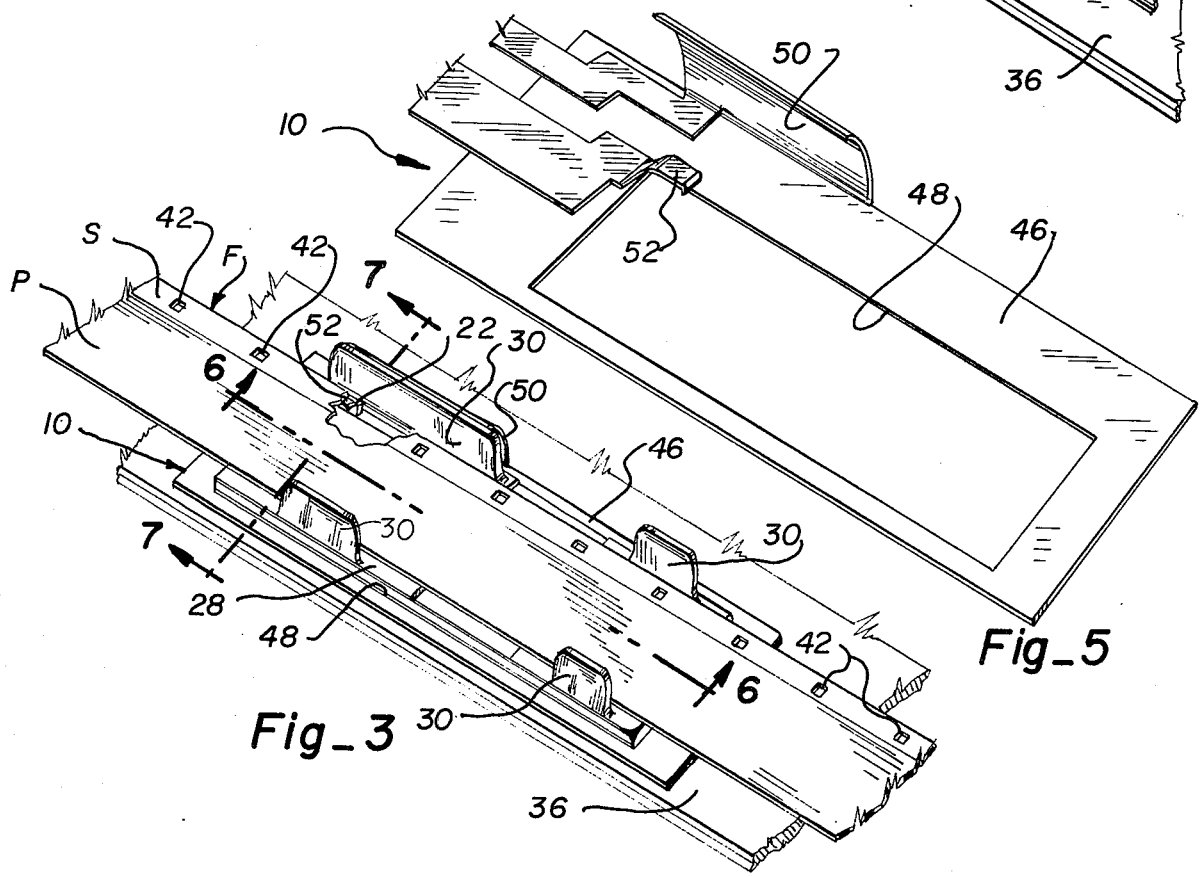

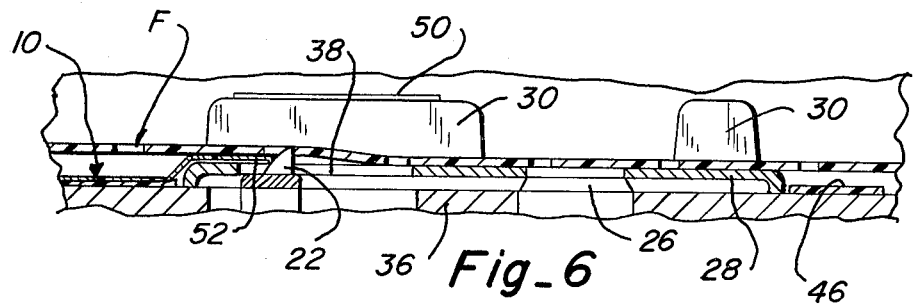
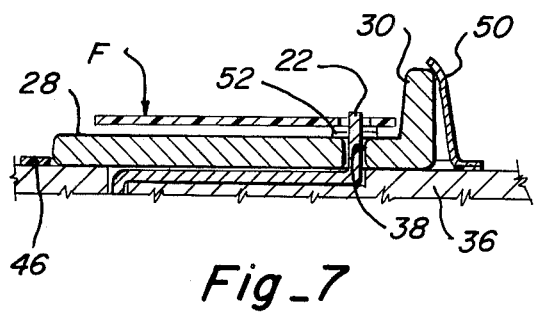
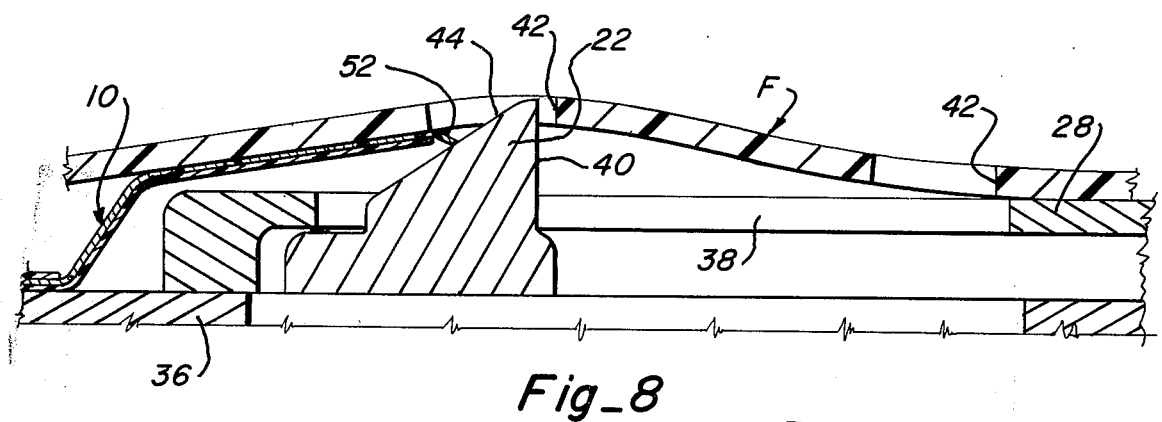
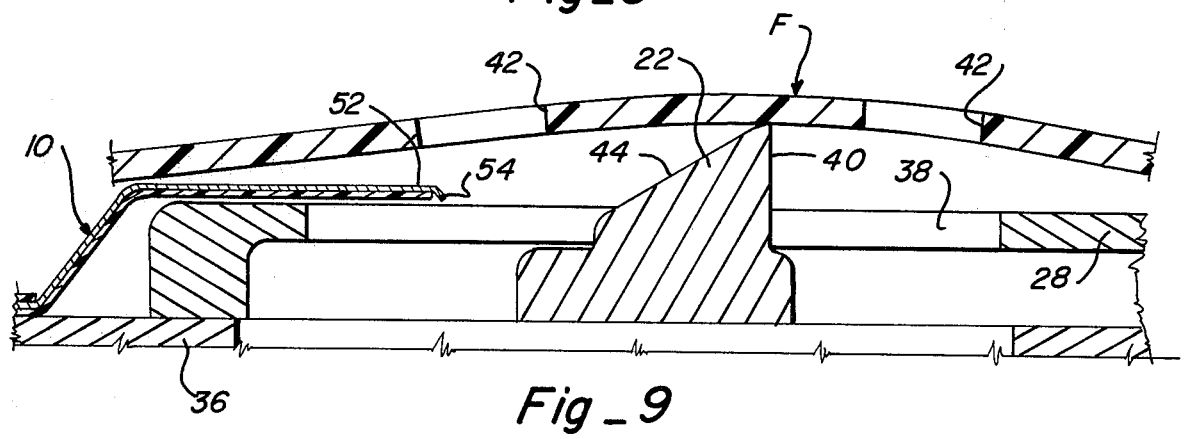

SYNC CONTACT SWITCH FOR MOVIE CAMERA

BACKGROUND OF THE INVENTION

Home movies have become increasingly popular with improvements and refinements in the ease with which the movies can be taken and the quality of the resultant movie product. Most recently it has become possible to make home movies with sound even though the cost, at this stage of development, is relatively high in comparison to the cost of making silent home movies.

Examples of home movie systems, which include sound, have a movie camera which includes a sound recording system therein so that the movie and sound are synchronized and recorded on a common film strip with the sound being magnetically recorded along an edge of the film. This type of camera, of course, is unusually large, due to the inclusion of the tape recording unit, and, therefore, is difficult to handle.

Other systems have attempted to coordinate movement of the film through a conventional silent camera with an external sound recording unit by implanting a switch in the working mechanism of the camera which transmits a signal to the tape recording unit each time a frame of film is exposed in the camera. This type of system, however, necessitates a costly modification of the camera in that the camera must be disassembled and professionally modified.

OBJECTS OF THE INVENTION

It is an object of the present invention to provide a new and improved switch for coordinating the operation of a movie camera with a sound recording unit to assist in making sound home movies.

It is another object of the present invention to provide a switch that can be easily incorporated into a conventional home movie camera to coordinate operation of the camera with a sound recording unit.

It is another object of the present invention to provide a switch which can be placed by a layman into the film compartment of a movie camera to make once per frame contact with the pull-down claw of the camera to assist in coordinating the movement of the film through the camera with a sound recording system.

It is another object of the present invention to provide a switch which is easily placed in the film compartment of a conventional home movie camera wherein the switch has a ground contact which is grounded through the movie camera and a live contact arm positioned to be engaged by the reciprocating pull-down claw so that the switch is closed each time a frame of film is exposed enabling the movement of the film through the movie camera to be coordinated with a sound recording unit operably connected to the switch.

SUMMARY OF THE INVENTION

The present invention relates generally to home movie systems and more particularly to a switch which can be easily placed within a conventional silent movie camera to transmit signals to a sound recording unit or the like in response to the advancement of film through the camera.

The present invention, in general, is directed to a once per frame contact switch which can be placed in a home movie camera, such as a Super 8 movie camera, by a layman so that the expertise of a professional camera repairman is not required to obtain once per frame signals for operation of an auxiliary electrical system. More particularly, the switch of the present invention is adapted to be positioned between a film cartridge, such as currently used for Super 8 film, and the film gate conventionally found in Super 8 movie cameras. The reciprocating pull-down claw, which is found in all such cameras and which protrudes into the film gate to intermittently advance each frame of film into an exposure opening is coordinated with shutter movement of the camera to properly position each frame of film in synchronization with the shutter. The switch of the present invention is grounded through the camera and includes a contact finger in alignment with the pull-down claw so that the switch is closed by the pull-down claw with each reciprocating cycle and consequently with each frame of film advanced through the camera.

The switch can, therefore, be used to transmit information, e.g., to a sound recording unit, which information relates to the advancement of the film through the camera so that the information can be subsequently used to synchronize the movie film with the recording tape when the film and recording tape are integrated into a sound movie strip. By way of example, an intermittent signal transmitted by the switch and a connected power supply can be used to record beeps or the like on a sound recording tape so that the sounds recorded on the tape as by a recorder unit can be later coordinated in perfect lip sync relationship with the movie film when the tape is joined with the movie film.

Other objects, advantages and capabilities of the present invention will become more apparent as the description proceeds when taken in conjunction with the accompanying drawings.

BRIEF DESCRIPTION OF THE DRAWINGS

FIG. 1 is a perspective view of a movie camera connected to a sound recording unit illustrating one use of the switch of the present invention;

FIG. 2 is an enlarged side elevational view of the movie camera of FIG. 1.

FIG. 3 is an enlarged fragmentary perspective view of the film gate of the camera of FIG. 2 with the switch of the present invention positioned on the gate;

FIG. 4 is an enlarged fragmentary perspective view of the film gate of the camera of FIG. 2 with fragmentary sections of a movie film in alignment therewith;

FIG. 5 is a perspective view of the switch of the present invention;

FIG. 6 is an enlarged vertical section taken along line 6—6 of FIG. 3;

FIG. 7 is an enlarged vertical section taken along line 7—7 of FIG. 3;

FIG. 8 is an enlarged fragmentary vertical section taken through the film gate of the camera of FIG. 2 and illustrating the cooperation of the pull-down claw of the camera with the movie film and the switch of the present invention;

FIG. 9 is a vertical section similar to FIG. 8 with the pull-down claw at a different location relative to the film and the switch.

DESCRIPTION OF A PREFERRED EMBODIMENT

The switch 10 of the present invention as best seen in FIG. 5, is adapted to be placed in the film compartment of a conventional movie camera to establish once per frame contact with the pull-down claw of the camera to thereby cooperate with a power source in establishing an electrical signal for each frame of film advanced through the camera. Such a switch has several useful functions one of which is to transmit signals correlated with the movement of the movie film through the camera to a tape recording unit so that the tape can be joined with the movie film to provide perfect lip sync sound movies. This particular application of the switch 10 is illustrated in FIG. 1, wherein a conventional movie camera 12, such as a hand held Super 8 movie camera having the switch 10 mounted therein is shown connected to a conventional tape recording unit 14 through conventional circuitry including an electrical power source mounted within a common box 16 to transmit the desired signal to the tape recorder in coordination with the operation of the camera.

In conventional Super 8 movie cameras, the film F is maintained in a cartridge which is positioned within a film compartment 18 of the camera so that the film extends through a film gate 20 (FIG. 4) and can be intermittently advanced through the film gate by a reciprocating pull-down claw 22. The film compartment 18 is typically accessible through a hinged access door 24 on the body of the camera so that the film can be easily placed in and removed from the compartment when desired. The film gate 20 is positioned within the film compartment 18 and has an exposure opening 26 in alignment with the shutter and the lens of the camera (not shown).

Referring to FIG. 4, the film gate 20 can be seen to comprise an elongated generally rectangularly shaped plate 28 with raised ridges 30 along opposite longitudinal edges thereof to define a channel or passage 32 through which the film F is confined for longitudinal intermittent movement by the pull-down claw 22. The gate 20 is secured with suitable screw type fasteners 34 to an internal wall 36 of the film compartment of the camera. Since the film gate in most Super 8 cameras is substantially the same and the operation of the pull-down claw is standard, a detailed description of the operation is not felt necessary. Suffice it to say that the pull-down claw is operated by the motor of the camera to reciprocate in a longitudinal direction relative to the gate so as to pass through one complete cycle for every frame of film to be exposed through the shutter. Of course, the shutter is conventionally synchronized with the pull-down claw to open when a frame of film is positioned in the exposure opening 26.

The pull-down claw 22 protrudes through a slotted opening 38 along one side edge of the channel 32 in the film gate and reciprocates within this channel to intermittently advance the film through the gate 20. The pull-down claw has a leading edge 40 which is substantially perpendicular to the face of the gate whereby when the pull-down claw is protruded into one of the perforated openings 42 along the edge of a Super 8 film strip, the leading edge 40 of the claw will be normal to the film and will advance the film along the channel 32 until a frame of film is aligned with the exposure opening 26. A reverse movement of the pull-down claw causes the film to be raised by a rearwardly directed cam surface 44 of the claw so that the claw can recede to the following perforation in the film and be received therein when the pull-down claw reaches its retracted position (FIG. 8). With the next forward stroke of the pull-down claw, the film will again be advanced placing the next successive frame of film in alignment with the exposure opening. This operation is conventional and, therefore, is not a substantive part of the present invention.

Referring to FIG. 5, the switch 10 of the present invention can be seen to include a generally rectangularly shaped plate 46 of an insulating material such as cardboard which has a rectangularly shaped opening 48 therein conforming in size and configuration to that of the periphery of the film gate 20. The base plate 46 of the switch is adapted to be placed over the film gate so that the gate protrudes into the opening 48 in the base plate and holds the base plate in position within the film compartment 18 of the camera. An adhesive may be applied to the lower surface of the base plate 46 to releasably affix the switch to the internal wall 36 of the film compartment upon which the film gate is mounted.

The switch 10 has a ground arm 50 protruding upwardly and inwardly from one side of the base plate 46 along the edge of the opening 48. This ground arm is preferably a strip of flat semi-flexible metal foil which is extended across the face of the base plate and away from one end of the base plate to establish the ground terminal of the switch.

A contact arm 52, also preferably made of a flat semi-flexible metal foil, protrudes upwardly and inwardly in a generally arcuate or gooseneck fashion from one end of the opening 48 in the base plate 46. The contact arm is adjacent one side edge of the opening 48 so as to be in longitudinal alignment with the pull-down claw 22 when the switch is positioned upon the film gate. The contact arm is continuous across the upper face of the base plate 46 and protrudes away from the end of the base plate in spaced adjacent relationship with the ground terminal to establish the live terminal of the switch.

As best seen in FIG. 3, the ground arm 50 of the switch, when the switch is placed upon the film gate 20, engages one of the raised ridges 30 along the side edge of the film gate so as to be grounded with the film gate through the camera. It should be noted, that the film gate as well as the housing for the camera and the internal wall 36 upon which the film gate is mounted, are all made of a metallic electrically conductive material. As mentioned previously, when the switch 10 is mounted upon the film gate, the contact arm 52 is in alignment with the path of movement of the pull-down claw of the camera and as can be seen in FIGS. 6, 8, and 9, the pull-down claw will engage the contact arm when it is near its retracted position (FIG. 8) of movement with the contact arm engaging the cam surface 44 of the pull-down claw. In retracting movement of the pull-down claw, the contact arm, which will normally retain its orientation of FIG. 9, is caused to ride along the cam surface for a short distance and thereby be flexed and elevated against the normal downward bias of the arm establishing positive contact with the claw. When the pull-down claw advances (FIG. 9) toward its forward position, of course, the engagement of the contact arm with the pull-down claw is broken.

Since the pull-down claw 22 is also made of a metallic electrically conductive material it is grounded through the camera so that when it makes contact with the contact arm 52, a circuit is established through the switch 10, the power source in the box 16 and the tape recording unit 14 to send an electrical signal to the tape recording unit which can be recorded on the tape. It will be appreciated by reference to FIGS. 6 through 9 that the contact arm 52 of the switch is disposed beneath the film F which is being advanced through the film gate so that the film will normally urge the contact arm toward the film gate. Since it is important that the contact arm be insulated from the film gate it is coated along its under surface with an insulating material such as mylar tape I. The distal end or leading tip 54 of the contact arm 52 is not insulated, however, so that when it engages the pull-down claw, electrical contact is made to close the switch and thereby transmit an electrical signal to the tape recording unit 14.

It will be appreciated that both the contact arm 52 and the ground arm 50 are positioned relative to the film gate 20 so that they do not engage the photo sensitive portion P of the film F where they could conceivably scratch or otherwise damage the photo sensitive film. Rather, the ground arm 50 is positioned outside of the channel 32 through the film gate to engage one of the raised ridges 30 on the film gate and the contact arm 52 is aligned with the perforated side portion S of the film which does not become exposed and developed with the photo sensitive portion P of the film.

Accordingly, a switch has been described which can be easily placed in a conventional Super 8 movie camera to provide once per frame contact for completing an electrical circuit which generates once per frame signals to be used, for example, to coordinate movement of film through the camera with tape in a sound recording unit. It will be appreciated that the switch can be mounted in the camera by a layman as the camera does not need to be disassembled to any extent. All that is necessary to mount the switch in the camera is to open the access door covering the film compartment of the camera and position the base plate of the switch around the film gate which is mounted on an internal wall of the film compartment so that the contact arm is in alignment with the pull-down claw and the ground arm engages one of the raised ridges along the side of the film gate. It will be apparent to those skilled in the art that the switch could be mounted on the film cartridge in such a location that it would relate to the film gate and pull-down claw in the same manner previously described.

Of course the ground and active contact terminals of the switch are connected by suitable conductive wiring to the power source, and preferably, this electrical wiring is in the form of flat conductive foil strips 56 so that they can extend out of the film compartment 18 with the access door 24 closed and without allowing light to enter the film compartment. The ground and active strips of foil are of course insulated from each other and from the surrounding environment in any suitable manner, as with mylar tape.

Although the present invention has been described with a certain degree of particularity, it is understood that the present disclosure has been made by way of example and that changes in details of structure may be made without departing from the spirit thereof.

What is claimed is:

1. In combination, a movie camera and a switch adapted to be placed in the movie camera, said camera having a film compartment with a channel therein through which the film is intermittently advanced, an electrically conductive reciprocal pull-down claw protruding into the channel and adapted to cooperate with the film to advance the film through the channel, said switch being adapted to close once per frame of film being advanced through the channel and including an insulated base member, said base member being positioned in the film compartment of the camera in adjacent relationship with said channel, active and grounding contact means on said base member for separately grounding the switch and engaging said pull-down claw of the camera with each reciprocating cycle of said pull-down claw.

2. The switch of claim 1 wherein said channel in the camera has ribs on opposite sides thereof protruding into the film compartment and wherein said base member has an opening therein adapted to receive said channel and ribs with the ribs engaging opposite sides of the opening to hold the base member in position.

3. The switch of claim 2 wherein said contact means comprises a semi-flexible arm extending into the path of reciprocal movement of the pull-down claw, said arm being adapted to flex with engagement with the pulldown claw.

4. The switch of claim 3 further including a coating of an insulating material on a portion of said arm to prevent the arm from becoming grounded through the camera.

5. In combination, a movie camera and a switch adapted to be placed in the movie camera, said movie camera having a film gate of an electrically conductive material, a reciprocally driven electrically conductive pull-down claw protruding into the gate and adapted to intermittently advance film through said gate, said camera having a film compartment having an electrically conductive wall, said gate being mounted on said wall so as to be grounded through the camera along with the pull-down claw, said switch including a base plate of an insulating material having an opening therethrough corresponding in size and configuration to the outer peripheral size and configuration of the film gate, said base plate being positioned in the film compartment in flat abutment with said conductive wall of the camera and in surrounding relationship with the film gate, an electrically conductive ground arm affixed to the base plate and protruding into said opening so as to engage the film gate, an electrically conductive contact arm affixed to the base plate and protruding into said opening so as to be in alignment with the reciprocating pull-down claw whereby said pull-down claw will make electrical contact with the contact arm in each cycle of reciprocation and thereby close the switch once per frame of film advanced through the gate by the pull-down claw.

6. The switch of claim 5 wherein said contact arm is of arcuate configuration to normally remain out of engagement with said film gate.

7. The switch of claim 5 wherein the contact arm is insulated from said film gate by an insulating coating applied to the contact arm and wherein said contact arm has an uncoated portion adapted to be engaged by said pull-down claw.

8. The switch of claim 5 wherein both of said ground arm and contact arm comprise flat conductive foils.

* * * * *